US012096523B2

(12) United States Patent
Park et al.

(10) Patent No.: US 12,096,523 B2
(45) Date of Patent: Sep. 17, 2024

(54) ELECTRIC ROASTING PAN

(71) Applicant: BIONEER CORPORATION, Daejeon (KR)

(72) Inventors: Han-Oh Park, Daejeon (KR); Jae-Ha Kim, Daejeon (KR); Jun Pyo Kim, Sejong-si (KR); Jieun Kim, Daejeon (KR)

(73) Assignee: BIONEER CORPORATION, Daejeon (KR)

( * ) Notice: Subject to any disclaimer, the term of this patent is extended or adjusted under 35 U.S.C. 154(b) by 960 days.

(21) Appl. No.: 15/734,197

(22) PCT Filed: May 31, 2019

(86) PCT No.: PCT/KR2019/006615
§ 371 (c)(1),
(2) Date: Dec. 1, 2020

(87) PCT Pub. No.: WO2019/231295
PCT Pub. Date: Dec. 5, 2019

(65) Prior Publication Data
US 2021/0168909 A1    Jun. 3, 2021

(30) Foreign Application Priority Data

Jun. 1, 2018   (KR) .................. 10-2018-0063426

(51) Int. Cl.
*H05B 3/14*         (2006.01)
*A47J 36/04*        (2006.01)
(Continued)

(52) U.S. Cl.
CPC .............. *H05B 3/145* (2013.01); *A47J 36/04* (2013.01); *A47J 37/105* (2013.01);
(Continued)

(58) Field of Classification Search
CPC .......... B22F 1/16; B22F 1/17; B22F 2998/00; B22F 2999/00; B22F 9/30; B22F 2203/05;
(Continued)

(56) References Cited

U.S. PATENT DOCUMENTS

2006/0027555 A1*  2/2006  Aisenbrey ........... A47J 37/0676
                                                                                    219/385
2016/0021704 A1*  1/2016  Elverud ................... H05B 3/58
                                                                                    252/502
(Continued)

FOREIGN PATENT DOCUMENTS

EP          2296431 A1 *  3/2011  ............. B82Y 30/00
JP       H07275130 A      10/1995
(Continued)

OTHER PUBLICATIONS

Japanese Patent Office, Office Action Issued in Application No. 2020-567034, Oct. 11, 2022, 11 pages.
(Continued)

*Primary Examiner* — Dana Ross
*Assistant Examiner* — Adam M Eckardt
(74) *Attorney, Agent, or Firm* — McCoy Russell LLP

(57) ABSTRACT

An electric roasting pan according to the present invention comprises: a roasting pan; a heating layer being in surface contact with the roasting pan and comprising a carbon nanotube and a silicone-based adhesive; and an electrode in contact with the heating layer. The electric roasting pan has excellent thermal efficiency thanks to the minimal heat loss thereof, can reach a target temperature within a short time to reduce a preheating time, and affords excellent cooking quality. Furthermore, the electric roasting pan can substantially prevent the occurrence of temperature deviation across
(Continued)

the area of the roasting pan during a temperature increase and is of high durability and safety.

12 Claims, 5 Drawing Sheets

(51) Int. Cl.
*A47J 37/10* (2006.01)
*C09D 101/28* (2006.01)
*H05B 1/02* (2006.01)

(52) U.S. Cl.
CPC ......... *C09D 101/28* (2013.01); *H05B 1/0261* (2013.01); *H05B 2203/007* (2013.01); *H05B 2203/013* (2013.01); *H05B 2203/016* (2013.01); *H05B 2214/04* (2013.01)

(58) Field of Classification Search
CPC ........ B22F 2207/07; B22F 9/026; B22F 9/00; C23D 5/02; H01C 17/06513; H01C 17/06533; H01C 17/065; H01G 4/0085; H01G 4/008; H05K 1/092; H05K 1/09; H05K 3/46; Y10T 428/256; Y10T 428/2991; Y10T 428/2993; F01N 13/00; F01N 2240/36; F01N 2340/06; F01N 3/101; F01N 3/2006; F01N 3/2892; F01N 2430/00; F01N 3/18; F01N 3/20; F01N 3/28; F02B 37/18; F02B 37/183; F02B 37/22; F02B 51/02; Y02T 10/12; A47J 36/02; A47J 36/04; A47J 37/10; A47J 37/105; A47J 37/0676; A47J 37/06; C09D 101/28; Y10S 220/912; H05B 1/0261; H05B 2203/007; H05B 2203/013; H05B 2203/016; H05B 2214/04; H05B 3/14; H05B 3/145; H05B 3/20; H05B 1/02; H01B 1/00; H01B 1/22
See application file for complete search history.

(56) References Cited

U.S. PATENT DOCUMENTS

| | | | |
|---|---|---|---|
| 2016/0254072 A1* | 9/2016 | Park | H01B 1/24 252/503 |
| 2021/0092801 A1* | 3/2021 | Bestetti | F24C 15/102 |

FOREIGN PATENT DOCUMENTS

| | | |
|---|---|---|
| JP | H11135243 A | 5/1999 |
| JP | 2006325948 A | 12/2006 |
| JP | 2007143804 A | 6/2007 |
| JP | 2016533001 A | 10/2016 |
| JP | 2017057246 A | 3/2017 |
| KR | 20100073630 A | 7/2010 |
| KR | 20120027081 A | 3/2012 |
| KR | 20140131757 A | 11/2014 |
| KR | 20170125247 A | 11/2017 |
| WO | 2015076390 A1 | 5/2015 |

OTHER PUBLICATIONS

Japanese Patent Office, Office Action Issued in Application No. 2020-567034, Jan. 18, 2022, 8 pages.
European Patent Office, Extended European Search Report Issued in Application No. 19812553.6, Feb. 21, 2022, Germany, 10 pages.
ISA Korean Intellectual Property Office, International Search Report Issued in Application No. PCT/KR2019/006615, Aug. 26, 2019, WIPO, 4 pages.

* cited by examiner

ELECTRIC ROASTING PAN

CROSS REFERENCE TO RELATED APPLICATIONS

The present application is a U.S. National Phase of International Application No. PCT/KR2019/006615 entitled "ELECTRIC ROASTING PAN," and filed on May 31, 2019. International Application No. PCT/KR2019/006615 claims priority to Korean Patent Application No. 10-2018-0063426 filed on Jun. 1, 2018. The entire contents of each of the above-listed applications are hereby incorporated by reference for all purposes.

TECHNICAL FIELD

The present invention relates to an electronic roasting pan.

BACKGROUND AND SUMMARY

Generally, as a device for cooking food or roasting meat at home or in a restaurant, a gas stove or a gas burner is commonly used. The conventional heating device using gas as energy is widely distributed and easily used, and fuel costs are low, but since a gas piping installation is essential, a place of use is limited. In addition, since a device using gas as energy generates heat through direct combustion, a risk of explosion or fire is high, and thus, recently, heating devices using electric energy with high safety, for example, an electric roasting pan has come into wide use at home.

An electric roasting pan is a type of electric heater which is supplied with electric energy and generates heat. An electric heater usually has a heat transfer unit generating heat using electric energy inside the body, and is configured to be provided with a roasting pan such as a metal pan or a stone pan on the upper portion so that the heat from the heat transfer unit is transferred to the roasting pan on the upper portion.

The electric roasting pan may be used wherever there are electrical facilities and is relatively widely used as compared with a gas piping installation, and thus, there is almost no limitation in the place of use. In addition, safety is relatively high, of course and convenience is excellent, as compared with the devices using gas. However, the electric roasting pan has a significantly low use rate as compared with the devices using gas, the main reason of which may be degraded cooking quality caused by relatively low firepower.

Specifically, the conventional electric roasting pan is provided with a roasting pan which is usually a thick grill made of stone or metal and a heat transfer unit at a position spaced apart from the lower side of the roasting pan at a regular intervals. The heat transfer unit used herein has a linear shape and is usually called a heat wire, and is arranged in a state of being bent several times in zigzags. In the conventional electric roasting pan using the heat wire, heat energy applied to the roasting pan is not uniformly transferred. In addition, since there is spacing formed between the roasting pan and the heat wire, thermal loss is great due to a region where heat may not be directly applied to the roasting pan. Due to the problems, the conventional electric roasting pan using the heat wire had a much slower heating rate than the device using gas, and thus, in order to cook at an appropriate temperature, a preheating time gets longer, whereby food cooking quality is very deteriorated.

In addition, since heat is locally applied, the kind of material used in the roasting pan is limited depending on the specific heat of the material. For example, when a stone pan is used as the roasting pan, a local temperature difference is severe due to the relatively high specific heat, and when the temperature difference is severe, a fatal problem that cracks occur in the stone pan may occur.

RELATED ART DOCUMENT

Patent Document

KR 10-2014-0131757A (Nov. 14, 2014)

DISCLOSURE

Technical Problem

An object of the present invention is to provide an electric roasting pan having excellent thermal efficiency and a rapid response time to reach a target temperature to shorten a preheating time and having excellent cooking quality.

Another object of the present invention is to provide an electric roasting pan which may substantially prevent an occurrence of temperature deviation depending on an area of a roasting pan at the time of a temperature rise and has high durability and safety.

Technical Solution

In one general aspect, an electric roasting pan includes a roasting pan, a heating layer in surface contact with the roasting pan, and an electrode in contact with the heating layer, wherein the heating layer is formed of a heating composition including carbon nanotubes and a silicon-based adhesive.

In an exemplary embodiment of the present invention, the electrode may include a plurality of unit electrode pairs composed of a positive electrode and a negative electrode, and the unit electrode pairs may be positioned to be spaced apart from each other.

In an exemplary embodiment of the present invention, the heating layer may include unit heating region surfaces having temperatures which are differently controlled by the unit electrode pairs, the other surface of the roasting pan in contact with the heating layer may include a plurality of unit roasting pan region surfaces corresponding to the unit heating region surfaces, and temperatures of the unit roasting pan region surfaces may be independently controlled from each other.

The electric roasting pan according to an exemplary embodiment of the present invention may further include a temperature sensor in contact with the roasting pan or the heating layer.

The electric roasting pan according to an exemplary embodiment of the present invention may further include a plurality of temperature sensors in contact with the unit heating region surfaces or the unit roasting pan region surfaces, and the temperatures of the unit roasting pan region surfaces may be independently controlled by the temperature sensor.

According to an exemplary embodiment of the present invention, the unit heating region surfaces may have compositions or composition ratios different from each other, and the temperatures of the unit heating region surfaces may be independently controlled by the difference in the composition or the composition ratio.

The electric roasting pan according to an exemplary embodiment of the present invention may further include a temperature sensor in contact with the roasting pan or the heating layer.

The electric roasting pan according to an exemplary embodiment of the present invention may further include a power supply unit which applies electric power independently to the unit electrode pairs.

In an exemplary embodiment of the present invention, the power supply unit may apply a voltage of 5 to 240 V to the heating layer.

In an exemplary embodiment of the present invention, the heating layer may have an average thickness of 10 μm to 2 mm.

In an exemplary embodiment of the present invention, the roasting pan may have an average thickness of 5 to 50 mm.

In an exemplary embodiment of the present invention, after the electrode is formed on one surface of the roasting pan, the heating composition may cover the electrode to be applied thereon.

In an exemplary embodiment of the present invention, the heating composition may be applied on one surface of the roasting pan to form the heating layer.

In an exemplary embodiment of the present invention, the heating composition may further include a binder.

In an exemplary embodiment of the present invention, the heating composition may include 1 to 50 wt % of the carbon nanotubes, 1 to 30 wt % of the silicon-based adhesive, 1 to 20 wt % of the binder, 1 to 20 wt % of a dispersant, and 1 to 90 wt % of an organic solvent.

In an exemplary embodiment of the present invention, the binder may include any one or more organic binders selected from ethyl cellulose, nitrocellulose, and the like, the dispersant may include any one or two or more selected from phosphorus ester salts of amino-containing oligomers or polymers; monoesters or diesters of a phosphoric acid; acid dicarboxylic acid monoesters; polyurethane-polyamine adducts; polyalkoxylated monoamines or diamines; and the like, and the organic solvent may include any one or two or more selected from acetone, methyl ethyl ketone, methyl alcohol, ethyl alcohol, isopropyl alcohol, butyl alcohol, ethylene glycol, polyethylene glycol, tetrahydrofuran, dimethyl formamide, dimethyl acetamide, N-methyl-2-pyrrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, diethyleneglycolethylether, and terpineol.

Advantageous Effects

The electric roasting pan according to the present invention minimizes a thermal loss to have excellent thermal efficiency, has a rapid response time to reach a target temperature to shorten a preheating time, and has excellent cooking quality.

In addition, the electric roasting pan according to the present invention may substantially prevent an occurrence of temperature deviation depending on a roasting pan area at the time of a temperature rise and have high durability and safety.

The effects described in the specification which are expected by the technical features of the present invention and the intrinsic effects are regarded as being described in the specification of the present invention, though the effects are not explicitly mentioned in the present invention.

DETAILED DESCRIPTION

Best Mode

Figure 1:
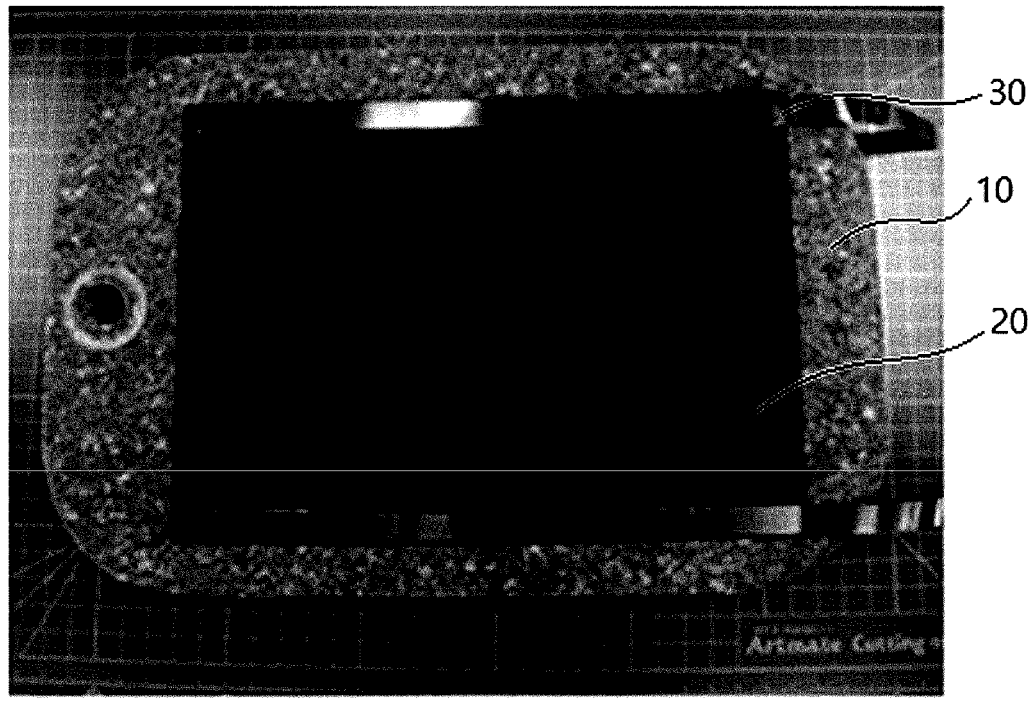
FIG. 1 is an actual image of an electric roasting pan manufactured in Example 1.

Hereinafter, the electric roasting pan according to the present invention will be described in detail with reference to the accompanying drawings.

The drawings illustrated in the present specification are provided by way of example so that the idea of the present invention may be sufficiently conveyed to a person skilled in the art. Therefore, the present invention is not limited to the provided drawings, but may be embodied in many different forms, and the drawings may be exaggerated in order to clear the spirit of the present invention.

Technical terms and scientific terms used in the present specification have the general meaning understood by those skilled in the art to which the present invention pertains unless otherwise defined, and a description for the known function and configuration obscuring the gist of the present invention will be omitted in the following description and the accompanying drawings.

The singular form of the term used herein may be intended to also include a plural form, unless otherwise indicated.

The unit of % used herein without particular mention refers to % by weight, unless otherwise defined.

The term layer, plate, or film means that each material forms a continuum and has a dimension having a relatively small thickness to a width and a length. Accordingly, they should not be interpreted as a two-dimensional flat plane by the above terms.

The electric roasting pan according to the present invention includes a roasting pan; a heating layer in surface contact with the roasting pan; and an electrode in contact with the heating layer, wherein the heating layer is formed of a heating composition including carbon nanotubes and a silicon-based adhesive.

The electric roasting pan according to the present invention includes a roasting pan 10 in surface contact with a heating layer 20 formed of a heating composition including carbon nanotubes and a silicon-based adhesive, thereby minimizing a thermal loss to have excellent thermal efficiency and having a rapid response time to reach a target temperature to rapidly increase a temperature of an object to which thermal energy will be transferred. Besides, an occurrence of temperature deviation depending on an area of the roasting pan 10 at the time of a temperature rise is minimized to have high durability and safety. Therefore, the electric roasting pan has a rapid response time to reach a target temperature to shorten a preheating time and rapidly transfers thermal energy to a cooking object with high firepower, thereby further upgrading a taste of the cooking object.

The other side of the roasting pan 10 in surface contact with the heating layer 20 includes a region which the object to which thermal energy will be transferred is in contact with and held in. The object mentioned in the present specification is not limited as long as it should be thermally treated using the electric roasting pan, and as an example, may mean a food material.

It may be more preferred that the other surface of the roasting pan 10 in contact with the heating layer has region surfaces which are adjustable to have different temperatures from each other, so that thermal energies having different values may be applied to a plurality of objects positioned on the region surfaces. As a means for this, an electrode 30 may include a plurality of unit electrode pairs 31, 32, 33, and 34 composed of a positive electrode and a negative electrode, and the unit electrode pairs 31, 32, 33, and 34 may be positioned to be in contact with a surface of the roasting pan 10 and be spaced apart from each other. In this case, by applying different electric power amounts (voltage) to the unit electrode pairs 31, 32, 33, and 34 positioned to be spaced apart from each other, a local temperature deviation may be caused in the heating layer 20, based on a spaced line formed by spacing between the unit electrode pairs 31, 32, 33, and 34 in the heating layer 20. By the means, the heating layer 20 may include a plurality of unit heating region surfaces having different temperatures from each other. That is, the heating layer 20 may include unit heating region surfaces which may have different temperatures from each other by differently controlling the temperature by the unit electrode pairs 31, 32, 33, and 34. Here, the unit heating region surfaces may have different temperature deviations from each other, and each of the unit heating region surfaces corresponding to the heating layer 20 may be substantially the same material or different materials having different compositions or composition ratios. When the unit heating region surfaces are different materials having different compositions or composition ratios, these may be adjacent to each other, that is, spaced apart from or in contact with each other or may be integrated, and it is preferred that the unit heating region surfaces are integrated in terms of manufacturing efficiency, but it is not limited thereto, of course.

In one electrode pair 31, 32, 33, and 34, a region positioned between the positive electrode and the negative electrode and the heating layer 20 including the region are heated by voltage applied to the positive electrode and the negative electrode, in which the region may mean only the unit heating region surface described above. Therefore, by adjusting the separation distance between the electrode pairs 31, 32, 33, and 34, the formed position and size of the unit heating region surfaces may be adjusted.

The other surface of the roasting pan 10 in contact with the heating layer may include a plurality of unit roasting pan region surfaces corresponding to the unit heating region surfaces. Here, the plurality of unit roasting pan region surfaces may be comparted. As described above, since it is possible to independently control the temperatures of the unit heating region surfaces, the roasting pan 10 from which thermal energy is transferred may include unit roasting pan region surfaces of which the temperatures are independently controlled. It is preferred that the unit roasting pan region surfaces are an identical material to each other, but they may not be the same material, of course.

As described above, on the other surface of the roasting pan 10 in surface contact with the heating layer 20, the unit heating region surfaces may be formed at the position corresponding to the unit heating region surfaces. That is, the roasting pan 10 may include a plurality of unit roasting pan region surfaces and the temperatures of the unit roasting pan region surfaces may be independently controlled. Specifically, the heating layer 20 may include a first unit heating region surface to a $n^{th}$ unit heating region surface, and the roasting pan 10 may include a first unit roasting pan region surface to a $n^{th}$ unit roasting pan region surface, wherein n is a natural number of 2 or more. When the electric roasting pan has a structure including unit roasting pan region surfaces of which the temperatures are independently adjustable, which is the same example in which the first unit roasting pan region surface is used for vegetables, the second unit roasting pan region surface is for seafood, the third unit roasting pan region surface is for meat, the fourth unit roasting pan region surface is for sauces, and so on, an electric roasting pan having comparted unit roasting pan region surfaces depending on the kind of objects may be provided. However, the use described above is only described as a preferred example, and the present invention is not limited to the use, and various kinds of objects may be held on each of the unit roasting pan region surfaces, of course. Furthermore, one or more kinds of objects may be held per each unit roasting pan region surface, for example, two or more objects may be held on each unit roasting pan region surface.

Besides, a large-sized food material object may be held to be spread over a large area region including two or more unit roasting pan region surfaces. In this case, when compartment lines between two or more unit roasting pan region surfaces form a step in a protruding or recessed form, an effect of grilling the food material object may be imparted. Here, the narrower the width of the compartment line is, the more the effect of grilling the food material object is improved.

As described above, the unit roasting pan region surfaces may be comparted. Specifically, when the unit heating region surfaces are comparted, they may be comparted by a compartment line formed between the unit heating region surfaces, and the structure is not largely limited and may have various forms and as an example, may be applied in various forms such as linear (horizontal, vertical), concentric circular, concentric rectangular, lattice (checkered), and curved shapes. In addition, an area of the heating layer 20 including the unit heating region surfaces may be appropriately adjusted depending on a size of a cooking container and an amount of the object.

The compartment line is for dividing and comparting the unit roasting pan region surfaces and the compartment may be formed by a step of protruding or recessing compartment line and may be comparted by an identification member (paint layer, film layer, and the like) without a step, and preferably, may be formed by a step. As a preferred example, it is preferred that the compartment line is formed to protrude, since the object held on the unit roasting pan region surfaces is prevented from being moved to another unit roasting pan region surface even in the case in which the object is liquid. When the unit roasting pan region surfaces are formed to be spaced apart from each other, the separation distance thereof, that is, the width of the compartment lines may be appropriately adjusted without large limitation, and for example, may be 2 to 50 mm, specifically 3 to 30 mm. When the compartment line is formed to be protruded or recessed, a protrusion height or recess height is not largely limited and may be for example, 2 to 50 mm, specifically, 3 to 30 mm. However, this has been described as a specific embodiment example, and the present invention is not limited thereto.

In addition, the unit roasting pan region surfaces may have steps having different heights from each other. As a specific example, an $n+1^{th}$ unit roasting pan region surface which is higher or lower than an $n^{th}$ unit roasting pan region surface may be formed, wherein n is a natural number of 1 or more.

Besides, the roasting pan 10 may include a protruding line 10s surrounding a unit roasting pan region surface, for example, an outermost unit roasting pan region surface, similarly to the compartment line, in terms for stably holding the food material object. The shape, structure, standard, size, and the like of the protruding line are as described for the compartment line.

It is preferred that the heating layer 20 is integrated, but the unit heating region surfaces may be comparted to be spaced apart from each other. The separation distance of the unit heating region surface, that is, the width of the separated line may be appropriately adjusted without large limitation, and for example, may be 1 to 50 mm, specifically 1 to 30 mm. However, this has been described as a specific embodiment example, and the present invention is not limited thereto.

The compartment line, the spaced line, and the separated line may be formed by a straight line, a curved line, or a combination thereof, and a form in which the line is partially broken in the middle or is closed, for example, a structure in which the unit heating region surfaces, the unit roasting pan region surfaces, or the electrodes 30 are partially not spaced from each other but connected to each other is also possible, of course. As an example of the unit roasting pan region surface, a liquid material discharged from the food material object may be discharged through a through hole 10h or the like, using a part where the unit roasting pan region surfaces are partially connected without being spaced apart from each other as a discharge flow path.

The electric roasting pan may further include a temperature sensor in contact with the roasting pan 10 or the heating layer 20. The temperature of the roasting pan 10 may be measured in real time by the temperature sensor, and an electric power amount applied to the heating layer 20 may be adjusted from the measured value to control the temperature of the roasting pan 10. Specifically, when thermal energy is transferred from the roasting pan 10 previously set to a target temperature to an object, the temperature of the roasting pan 10 is instantaneously lowered or the temperature of the roasting pan 10 is changed by other environmental conditions, and thus, it may be difficult to precisely transfer the thermal energy in a required amount to the object. However, since the temperature of the roasting pan 10 may be measured in real time by the temperature sensor, precise control such as allowing a thermal energy amount which the heating layer 20 transfers to the roasting pan 10 to be corrected in real time to maintain a desired temperature, is possible. In particular, since the electric roasting pan according to the present invention has a structure in which the heating layer 20 is in surface contact with one surface of the roasting surface 10, it is possible to precisely measure the temperature without a local temperature deviation only by one or a few temperature sensors and to cover a large area of the roasting pan 10.

In addition, two or more temperature sensors may be provided, and in this case, the temperature sensors may be positioned to be spaced apart at a predetermined interval on the roasting pan 10 or the heating layer 20. Thus, a local temperature deviation may be sensed, it may be confirmed whether the roasting pan 10 or the heating layer 20 is damaged, and precise temperature control is possible.

Furthermore, two or more temperature sensors are used, the temperature of a certain region surface of the roasting pan 10 may be independently controlled. Specifically, each temperature sensor may be provided to correspond to the unit heating region surfaces or the unit roasting pan region surfaces. That is, the electric roasting pan may further include a plurality of temperature sensors in contact with the unit heating region surfaces or the unit roasting pan region surfaces, and the temperatures of the unit heating region surfaces or the unit roasting pan region surfaces may be independently controlled by the temperature sensor. Therefore, the temperature of each of the unit roasting pan region surfaces of the roasting pan 10 may be measured in real time by the temperature sensor, and the electric power amount applied to each of the unit heating region surfaces or the electrode 30 may be adjusted by the measured value to independently control the temperature of each of the unit roasting pan region surfaces of the roasting pan 10.

The unit heating region surfaces may have the same composition or composition ratio, or have different compositions or composition ratios from each other. Even in the case in which the unit heating region surfaces have the same or different composition or composition ratio, as described above, the electric power amount applied to each unit heating region surface or the electrode 30 may be adjusted to independently control the temperature of each of the unit roasting pan region surfaces of the roasting pan 10.

When the unit heating region surfaces have different compositions or composition ratios from each other, the thermal conversion efficiency which is conversion from electric energy to thermal energy for each of the unit heating region surfaces is different, and thus, the temperature of certain region surfaces of the roasting pan 10 each corresponding to the unit heating region surfaces may be automatically changed. For example, the region surface of the roasting pan 10 corresponding to the unit heating region surface having high thermal conversion efficiency may maintain a higher temperature than the region surface of the roasting pan 10 corresponding to the unit heating region surface having low thermal conversion efficiency. Therefore, a different temperature may be imparted to each of the region surfaces of the roasting pan 10, without adjusting the electric power applied to the heating layer 20 or even in the case in which the electric power amount applied to the heating layer 20 is the same. A means to make the composition or the composition ratio of the unit heating region surfaces different is possible to form the heating layer 20 from the heating composition by making the composition or the composition ratio of the heating composition described later different.

A control unit which receives temperature information of the unit roasting pan region surfaces or the unit heating region surfaces from the temperature sensors and independently adjusts the electric power amount applied to the unit heating region surfaces or the electrode 30 to independently control the temperatures of the unit roasting pan region surfaces, may be further included. Various control means which allow the user to adjust the temperatures of the unit roasting pan region surfaces from each temperature value measured by the temperature sensor or automatically adjust the temperatures of the unit roasting pan region surfaces, may be used. Since the specific structure and the position to be provided of the control unit are a widely known technique, the known technique may be referred to, and for example, the control unit may be provided in the inside, outside, or away from the outside of the electric roasting pan, but the present invention is not limited thereto, of course. For example, the control unit may be an analogue type, a digital type, or a combination type thereof, and also a physical adjustment unit which allows easy control by the user may be further provided. The physical adjustment unit may have a mechanical form such as a button type or a rotary type or may be implemented in various forms such as an electronic type. In addition, in some cases, a thermal conduction reducing member which may minimize heat conducted from the roasting pan 10 through a known means, or the like, may be further provided. Besides, the electric roasting pan may be further provided with a display unit which displays a temperature value received from the temperature sensor. Since the specific structure and the position to be provided of the display unit are a widely known technique, the known technique may be referred to, and for example, the display unit may be provided on the outer surface or away from the outside of the electric roasting pan, but the present invention is not limited thereto, of course.

As the temperature sensor, a contact type sensor, a non-contact type sensor, or both of them may be used, and a contact type sensor is preferred in terms of significantly improving a degree of precision of temperature control. Specifically, the kind of temperature sensor is not largely limited, and as an example, may be a semiconductor type, a thermocouple type, a resistance temperature detector (RTD) type, an NTC thermistor type, and the like.

The electric roasting pan may further include a power supply unit which applies electric power to the electrode 30. Here, the power supply unit is a means to supply electric energy, and is not limited to those previously known. Since the specific structure and the position to be provided of the power supply unit are a widely known technique, the known technique may be referred to, and for example, the power supply unit may be provided in inside, on the outer surface, or away from the outside of the electric roasting pan, but the present invention is not limited thereto, of course.

The electrode 30 may be any known electrode (30) materials having conductivity, and a copper-based electrode 30 such as an electrolyte copper foil, a rolled copper foil, and copper foil may be usually mainly used, but other than that, various metal or conductive materials may be used. In addition, any form and structure of the electrode 30 may be used as long as the electrode has conductivity, and thus, they are not limited. The thickness of the electrode 30 may be also appropriately set as long as the electrode has appropriate durability, and thus, it is not limited, and for example, may be 1 to 1,000 µm. However, this is described as a specific example, and the present invention is not interpreted as being necessarily limited thereto.

The electrode 30 is positive electrodes 31a, 32a, 33a, and 34a and negative electrodes 31b, 32b, 33b, and 34b and may be in contact with the heating layer 20 as an electrode pair. That is, the electrode 30 may include a plurality of unit electrode pairs 31, 32, 33, and 34 each in contact with the unit heating region surfaces. Specifically, a first unit electrode pair 31a and 31b may be provided to be spaced apart from each other and in contact with a first unit heating region surface 21, a second unit electrode pair 32a and 32b may be provided to be spaced apart from each other and in contact with a second unit heating region surface 22, a third unit electrode pair 33a and 33b may be provided to be spaced apart from each other and in contact with a third unit heating region surface 23, and a fourth unit electrode pair 34a and 34b may be provided to be spaced apart from each other and in contact with a fourth unit heating region surface 24. Here, electric power may be applied from the power supply unit independently of each other to unit electrode pairs 31, 32, 33, and 34. That is, different electric power amounts of electric energy from each other may be applied from the power supply unit to the unit electrode pairs 31, 32, 33, and 34.

Figure 9:
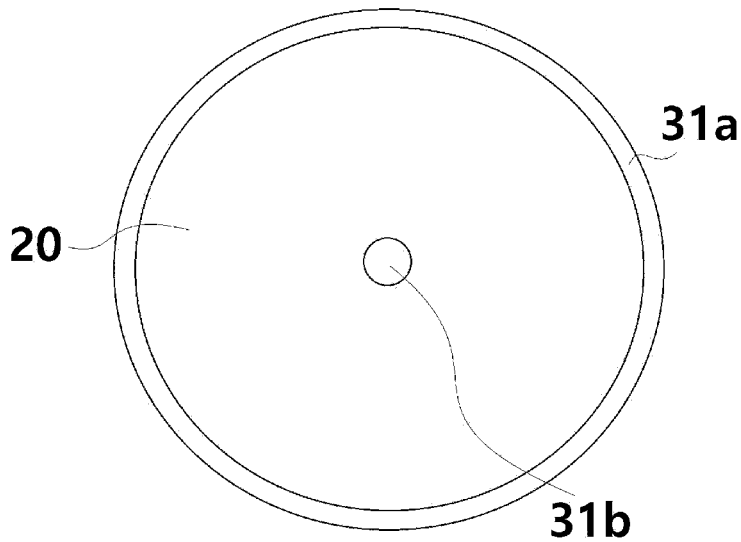
Figure 10:
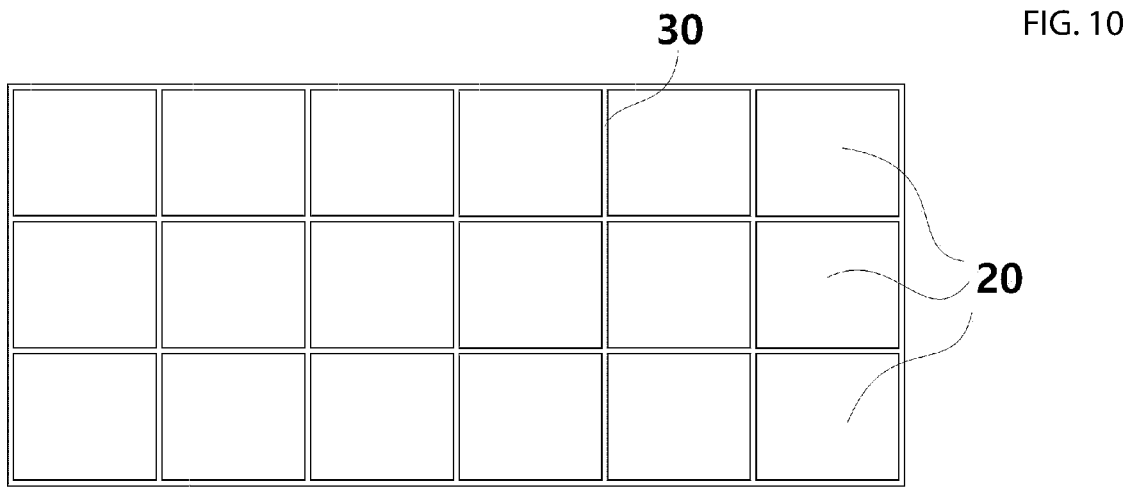
Figure 11:
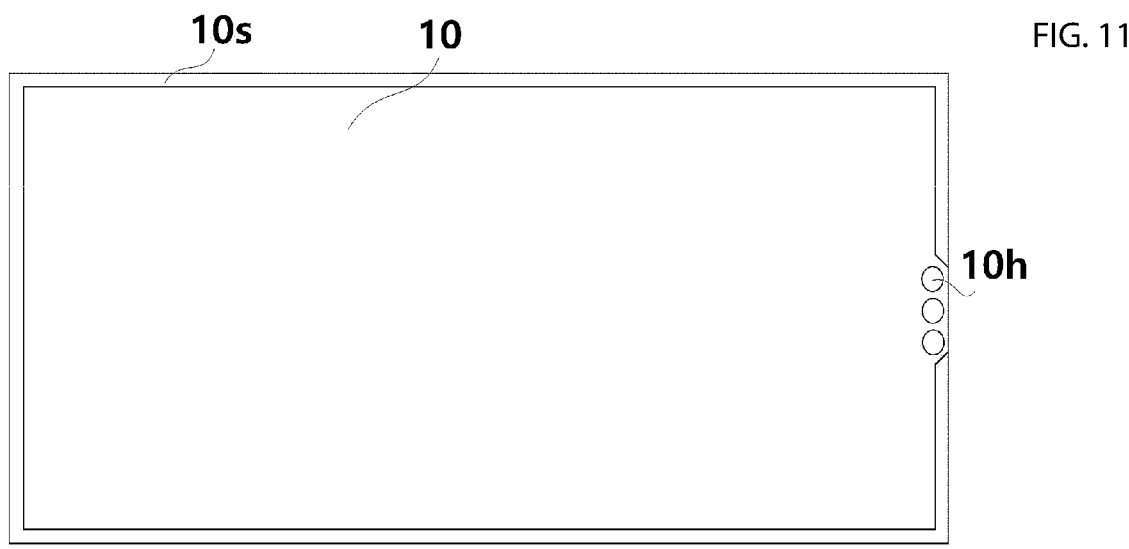
FIG. 11 is a drawing showing an upper surface of the electric roasting pan which holds food material objects, in the electric roasting pan according to an exemplary embodiment of the present invention, showing the upper portion of the electric roasting pan seen from an upper side.

As a specific example, the positive electrode or the negative electrode of the electrode pairs 31, 32, 33, and 34 may be in a form in which both ends are not connected or in a closed form in which both ends are connected. When the positive electrode or the negative electrode are in the closed form, that is both ends are connected, a counter electrode (positive electrode or negative electrode) may be positioned in an empty space inside formed by the connected both ends. When the electrode has such structure, it may have more effective thermal efficiency and performance. More specifically, as shown in FIG. 9, a ring-shaped electrode (positive electrode or negative electrode) having a closed curve and a counter electrode (negative electrode or positive electrode) inside the electrode may be positioned.

As long as the electrode 30 may be in contact with the heating layer 20 to apply electric energy, the form, structure, and formation method thereof are not largely limited, and as an example, the method as follows may be exemplified. As a specific example, a method of covering the heating composition for forming the heating layer 20 to be applied after forming the electrode 30 on one surface of the roasting pan 10, a method of applying the heating composition on one surface of the roasting pan 10 to form the electrode 30 on the heating layer 20 after the heating layer 20 is formed, or the like may be included. Here, the method in which the electrode 30 is formed (bonded) on the roasting pan 10 or the heating layer 20 may be due to the bonding characteristics in the process in which the heating composition is cured to form the heating layer 20, or may be bonded by a known conductive adhesive composition. As an example of the conductive adhesive composition, it may be an epoxy resin composition including carbon nanotube-silver composites. However, this has been described as a preferred embodiment example, and the present invention is not limited thereto, of course.

In the electric roasting pan according to the present invention, the heating unit as a layer is present to be directly in surface contact with one surface of the roasting pan 10, differently from a conventional electric roasting pan in which a heating unit as a heat wire is formed on the roasting pan 10, whereby a contact area of the roasting pan 10 with the heating unit is large and high thermal energy may be rapidly applied to the roasting pan 10 as compared with the conventional electric roasting pan. As a specific example, the electric roasting pan according to an example of the present invention may satisfy the following Relation 1. In the following Relation 1, $A_H$ is an area of the heating layer 20 in contact with the roasting pan 10, and $A_T$ is an entire area of the roasting pan 10. Here, the entire area of the roasting pan 10 may refer to the entire area of the roasting pan 10 to which heat is conducted, having similar or substantially the same thermal conductivity per a unit area, and specifically, may refer to the entire area of the roasting pan 10 corresponding to the entire region holding the object to which thermal energy is transferred, that is, the entire area of the unit roasting pan region surface.

$$0.5 \leq A_H/A_G \leq 1 \quad \text{Relation 1}$$

In the conventional electric roasting pan in which the heating unit which is a heat wire is formed on the roasting pan 10, a bonding composition is used as an adhesion means between the heat wire and the roasting pan 10, and there is a part where spacing is present between the heat wire and the roasting pan 10, or even in the case in which there is no such part initially, the spacing is highly likely to be formed thereafter by as a long-term use. Therefore, the conventional electric roasting pan using a heat wire has limitations of very low thermal efficiency of course, and a very low heating rate. However, the electric roasting pan according to the present invention includes the heating layer 20 formed of the heating composition, so that the roasting pan 10 and the heating layer 20 are directly surface-bonded to each other to have high thermal efficiency of course, and has a very high heating rate.

The electric roasting pan according to the present invention is formed by bringing the heating layer 20 into surface contact with one surface of the roasting pan 10 by the heating composition, and even in a state in which a surface roughness is somewhat high, such as one surface of the roasting pan 10 being not even or smooth in the process of formation (manufacture), the electric roasting pan may be formed with high adhesive force and bonding force. Therefore, since there is substantially no spacing between the heating layer 20 and the roasting pan 10, high thermal efficiency and response speed may be implemented. As an example, even in the case in which one surface of the roasting pan 10 with which the heating layer 20 is to be in surface contact has a surface roughness of 100 to 1,000 μm, the electric roasting pan may be manufactured without forming spacing between the heating layer 20 and the roasting pan 10 with high adhesive force and bonding force.

The thickness of the roasting pan 10 and the heating layer 20 may be appropriately adjusted depending on the purpose and the scale to be required, but it is preferred to have an average thickness in the range described later.

The heating layer 20 may have an average thickness of 10 μm to 2 mm. When this is satisfied, problems of requiring high voltage due to an excessively small thickness, and producing cracks in the heating layer 20 or significantly lowering sheet resistance by an excessively large thickness to make heating difficult in reality, may be prevented.

The roasting pan 10 may have an average thickness of 5 to 50 mm, specifically 5 to 30 mm. When this is satisfied, problems of reducing heat retention by an excessively small thickness to lost heat to the outside and increasing a pre-heating time and electric power consumption by an excessively large thickness, may be minimized.

The material of the roasting pan 10 may be appropriately adjusted depending on the kind of object to which thermal energy is transferred. Specifically, the material is not largely limited as long as it has thermal resistance to endure at 5-350° C. for a long time and may conduct heat by the heating layer 20.

As the kind of roasting pan 10, a material including any one or two or more selected from metal-based, ceramic-based, carbon-based, and polymer-based materials may be used. A specific example of the metal-based material may include any one or two or more selected from stainless, iron, copper, magnesium, aluminum, alloys thereof, and the like. A specific example of the ceramic-based material may include any one or two or more selected from various rocks and minerals such as granite, marble, volcanic stone, gem stone, and amphibole; mineral-derived plastics such as glass, Pyrex, quartz, and ceramics; oxides of metals selected from Ti, Mg, Cu, Au, Ag, Cr, Pt, Fe, Al, and Si; and the like. A specific example of the carbon-based material may include any one or two or more selected from graphite, carbon nanotubes, carbon fiber, diamond, diamond-like carbon (UDC), graphene, and the like. A specific example of the polymer-based material may include any one or two or more selected from synthetic polymers, natural polymers, woods, pulps such as paper, and the like. The roasting pan 10 is not largely limited as long as a food material may be baked thereon and the roasting pan has enough thermal resistance to bake the food material, but it may be preferred to use rocks or minerals described above in terms of further improving the taste of the food material. However, this has been only described as a specific example, and may be appropriately adjusted depending on the specific kind of object to which thermal energy is transferred, and thus, the present invention is not necessarily limited thereto.

The shape of the roasting pan is not limited, and may have various shapes such as a circle, an ellipse, n-gon (n is 3 or more), and a shape having a curve and a plane, of course.

The electric roasting pan may further include an insulating film covering the heating layer 20 and/or the electrode 30. The insulating film may cover the heating layer 20 and/or the electrode 30 to prevent electricity from flowing in an unrequired path and preferably has high electric resistance, and for the specific kind thereof, known literatures may be referred. As a specific example, a commonly known insulating paste is applied and cured to form an insulating layer on the heating layer 20 and the electrode 30. A specific example of the insulating paste may include insulating ceramic powder and an organic binder, and may be those having a viscosity of 1,000 to 80,000 cps at 25° C. However, this has been described as a preferred embodiment example, and the present invention is not limited thereto, of course.

The voltage applied to the heating layer 20 may be controlled by various conditions such as the thickness of the heating layer 20 and the separation distance between the electrodes 30, may be appropriately adjusted as long as a temperature to be desired may be reached, and for example, it may be 5 to 240 V, but it is not limited thereto, of course. Specifically, the electric roasting pan according to an exemplary embodiment of the present invention may have a heating rate of 8 to 30° C./min for initial 10 minutes when a voltage of 50 to 70 V is applied. In addition, by adjusting the composition of the heating layer 20, the electric roasting pan may be used with a DC power supply of a low voltage of 12 V.

As described above, in the electric roasting pan according to the present invention, the heating layer 20 is in surface contact with the roasting pan 10 while the heating layer is formed by the heating composition including carbon nanotubes and a silicon-based adhesive, thereby implementing the effects described above.

In addition, the heating layer 20 may have different thermal conversion efficiency depending on the composition or the composition ratio, thereby automatically maintaining different temperatures from each unit heating region surface.

Hereinafter, the heating layer 20, the composition/composition ratio of the heating composition for forming the heating layer, and the method of forming the heating layer will be described in more detail.

The heating composition includes carbon nanotubes and a silicon-based adhesive.

As the carbon nanotube (CNT), any commonly known carbon nanotubes may be used. A specific example of the carbon nanotube may include a single wall CNT, a double wall CNT, a multi-wall CNT, and the like, and may include two or more thereof. The average diameter and the average length of the carbon nanotube is not largely limited, and as an example, may be 0.9 to 3.0 nm and 0.1 to 30 μm, respectively. However, this has been described as a specific embodiment example, and the present invention is not limited thereto, of course.

The silicon-based adhesive may be a polymer having a polysiloxane main chain in which a silicon (Si) atom and an oxygen (O) atom are alternated, and may mainly have a structure in which usually two organic atomic groups such as alkyl groups (methyl, ethyl, propyl, and the like) or a phenyl group (—$C_6H_5$) are bonded to each silicon atom. As a specific example, the silicon-based adhesive may have hydrogen, a hydroxyl group, a methyl group, and/or a phenyl group bonded to a polysiloxane main chain. Here, it may be a preferred example that the content of the polysiloxane mainchain, that is, $SiO_2$ is 45 to 65 wt %, preferably 47 to 63 wt %, with respect to the total weight of the silicon-based adhesive.

As a preferred example, the silicon-based adhesive has a silanol group having a hydroxyl group as a functional group, preferably at 0.1 to 10 wt %, more preferably 1 to 6 wt %, with respect to the total weight of the silicon-based adhesive. When this is satisfied, the bonding characteristic between the roasting pan and the heating layer 20 may be further improved, the thermal conductivity may be further improved, and deterioration of dryness, strength, flexibility, and processability may be prevented. However, this has been described as a preferred embodiment example, and the present invention is not limited thereto, of course.

As a preferred example, the silicon-based adhesive may have a methyl group and a phenyl group at ratio in a certain range for further improving thermal stability. Specifically, the ratio between the methyl group and the phenyl group may be 0.3 to 2.5 mol of the phenyl group to 1 mol of the methyl group, preferably 0.4 to 2.0 mol of the phenyl group to 1 mol of the methyl group. When this is satisfied, the durability of the electric roasting pan, specifically the roasting pan 10 may be further improved, the electric roasting pan may be used at a higher temperature for a long time, and reduced durability of the roasting pan due to rapid temperature change may be decreased. In addition, a decrease in mechanical strength and thermal resistance and a decrease in water repellency and processability may be prevented. However, this has been described as a preferred embodiment example, and the present invention is not limited thereto, of course.

The silicon-based adhesive may be cured by an occurrence of bonding between functional groups by heating, and a crosslinking degree of 55 to 80% and a weight average molecular weight of 1,000 to 400,000 may be preferred in terms of processability and mechanical properties. However, this has been described as a preferred embodiment example, and the present invention is not limited thereto, of course.

The composition ratio of the composition is not largely limited, but preferably 1 to 50 wt % of the carbon nanotubes and 1 to 30 wt % of the silicon-based adhesive, and more specifically 3 to 40 wt % of the carbon nanotubes and 2 to 20 wt % of the silicon-based adhesive may be included. Here, the composition may further include an organic solvent, and the content thereof may be used as a residual amount.

The organic solvent is not limited, and as an example, any one or two or more selected from acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-prrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, diethylene glycol ethyl ether, terpineol, and the like, may be included.

As a preferred example, the heating composition may further include any one or more selected from a binder, a dispersant, and the like. When the binder is included in the heating composition, the processability of the heating composition is improved, and when the heating composition is applied to the roasting pan 10 to form the heating layer 20, adhesiveness with the roasting pan 10 in this process may be further improved.

The binder is not limited as to the preparation method thereof or the like, but it may be preferred to have a viscosity in a certain range in terms of improving applicability of the heating composition. As a specific example, the binder may have a viscosity of 10 to 50,000 centipoise (cps) at 25° C.

The binder may include any one or more organic binders selected from ethyl cellulose, nitrocellulose, and the like. The organic binder is resistant to high temperature, has excellent adhesion and durability, and may be efficiently heated even at a relatively low voltage. However, this is described as a preferred example, and the present invention is not interpreted as being necessarily limited thereto.

When the binder is included in the heating composition, it may be included at 1 to 20 wt %, preferably 3 to 15 wt % with respect to the total weight of the heating composition. However, this has been described as a preferred embodiment example, and the present invention is not limited thereto, of course.

The dispersant may include any one or two or more selected from phosphorus ester salts of amino-containing oligomers or polymers; monoesters or diesters of a phosphoric acid; acidic dicarboxylic acid monoesters; polyurethane-polyamine adducts; polyalkoxylated monoamines or diamines; and the like, but the present invention is not limited thereto, of course.

When the dispersant is included in the composition, it may be included at 1 to 20 wt %, preferably 2 to 10 wt % with respect to the total weight of the composition. However, this has been described as a preferred embodiment example, and the present invention is not limited thereto, of course.

In a preferred example, when the heating composition further includes the binder, the dispersant, and the organic solvent, the composition ratio thereof may be preferably 1 to 50 wt % of the carbon nanotubes, 1 to 30 wt % of the silicon-based adhesive, 1 to 20 wt % of the organic binder, 1 to 20 wt % of the dispersant, and 1 to 90 wt % of the organic solvent. However, this has been described as a preferred embodiment example, and the present invention is not limited thereto, of course.

The heating layer 20 is not limited as to the formation method thereof, and as an example, there are various methods such as a method of applying the heating composition including the carbon nanotubes and the silicon-based adhesive on one surface of the roasting pan 10 to form the heating layer or a method of bonding a film prepared by the heating composition to one surface of the roasting pan 10 to form the heating layer. Specifically, the method of forming the heating layer 20 may include a method of coating one surface of the roasting pan 10 with the heating composition and curing the composition, a method of attaching a film prepared by curing the heating composition to one surface of the roasting pan 10, and the like. Coating may be performed using known various means, and as an example, various methods such as a spray method, a dip coating method, and an application method may be included. Curing may be performed using known various methods such as thermal curing, natural curing, and photocuring, and a method appropriate for curing of the heating composition may be used. In addition, coating may be performed twice or more, and two layers of films may be further laminated to form the heating layer 20.

The heating composition may be a slurry form or a film form before the heating layer 20 is formed on the roasting pan 10. Specifically, when the heating composition is applied on one surface of the roasting pan 10 to form the heating layer 20, the heating composition may be a slurry form. When the heating composition is a slurry form, the heating composition may have a viscosity in a state of medium hardness between a solid and a liquid, in a process of forming the heating layer 20 on the roasting pan 10.

Hereinafter, the present invention will be described in detail by the Examples, however, the Examples are for describing the present invention in more detail, and the scope of the present invention is not limited to the following Examples.

Preparation Example 1

Preparation of Heating Composition 1.5 g of carbon nanotubes (Hanwha Nanotech Corporation) was added to an Erlenmeyer flask, and 33.75 g of α-terpineol as an organic solvent, 1.25 g of ethyl cellulose, 5 g of a silicon-based adhesive (RSN-0806, Dow Corning), and 0.75 g of a dispersant (DISPERBYK-192, BYK) were added thereto. Subsequently, the Erlenmeyer flask was mounted on a stirrer and stirring was performed for 60 minutes for sufficient dispersion to prepare a heating composition.

Example 1

A stone pan (Jangsu Gopdol) having an area of 300 mm×195 mm and a thickness of 20 mm was prepared as a roasting pan. A surface of the roasting pan was washed with ethanol and was heat-treated at 250° C. for 30 minutes to remove foreign matters and the like which may be present on the surface of the roasting pan.

The heating composition prepared in Preparation Example 1 was applied at a wet thickness of 600 μm on a lower surface of the heat-treated roasting pan and cured at 300° C. for 30 minutes to surface-coat the roasting pan with a heating layer. The coating process was repeated once again to finally manufacture an electric roasting pan which was surface-coated on the lower surface of the roasting pan with the heating layer having a wet thickness of 1.2 mm. The area of the heating layer was 220 mm×160 mm at this time.

Figure 7:
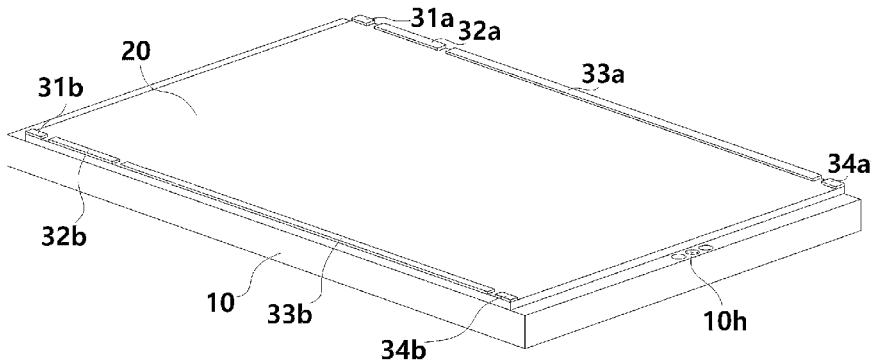
FIG. 7 is perspective view of an electric roasting pan according to an exemplary embodiment of the present invention, which is a perspective view showing a lower portion of the electric roasting pan seen from a lower side, that is, a perspective view showing the other surface of the roasting pan in surface contact with a heating layer.
Figure 8:
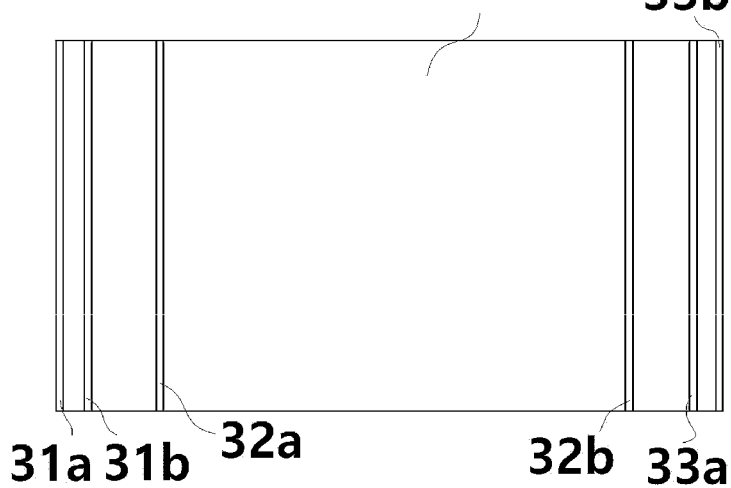
FIGS. 8 to 10 are drawings showing the lower portion of the electric roasting pan in which the heating layer and an electrode are positioned on the lower portion, seen from the lower side, that is, drawings showing the lower surface of the electric roasting pan, in the electric roasting pan according to an exemplary embodiment of the present invention.

Then, a pair of copper electrodes were bonded each of both end portions of the heating layer, and as shown in FIG. 7, a copper electrode having a width of 1 cm in an inward direction from an outermost end portion of the heating layer was bonded in a linear in a length direction of both end portions. Epoxy silverpaste (ELCOAT, CANS, Cat. no.: A-200) was used to bond the copper electrode and the heating layer.

For thermal insulation and insulation of the entire area of the copper electrode and the heating layer, an insulating paste (AccuPaste™ Insulating Paste, BIONEER CORPORATION, Cat.) no.: TC-5000) was applied to the copper electrode and the heating layer to form an insulating film.

Example 2

The process was performed in the same manner as in Example 1, except that a roasting pan having a thickness of 15 mm was used instead of the roasting pan having a thickness of 20 mm.

Experimental Example 1

Evaluation of Heating Rate of Electric Roasting Pan Depending on Voltage

In order to test a heating rate of the electric roasting pan manufactured in Example 1 depending on voltage, both ends of the electrode of the electric roasting pan were connected to Slidacs and voltages of 50, 60, and 70 V were applied to measure the temperature of the stone pan of the electric roasting pan with a thermal imaging camera (TiS50, FLUKE).

Figure 2:
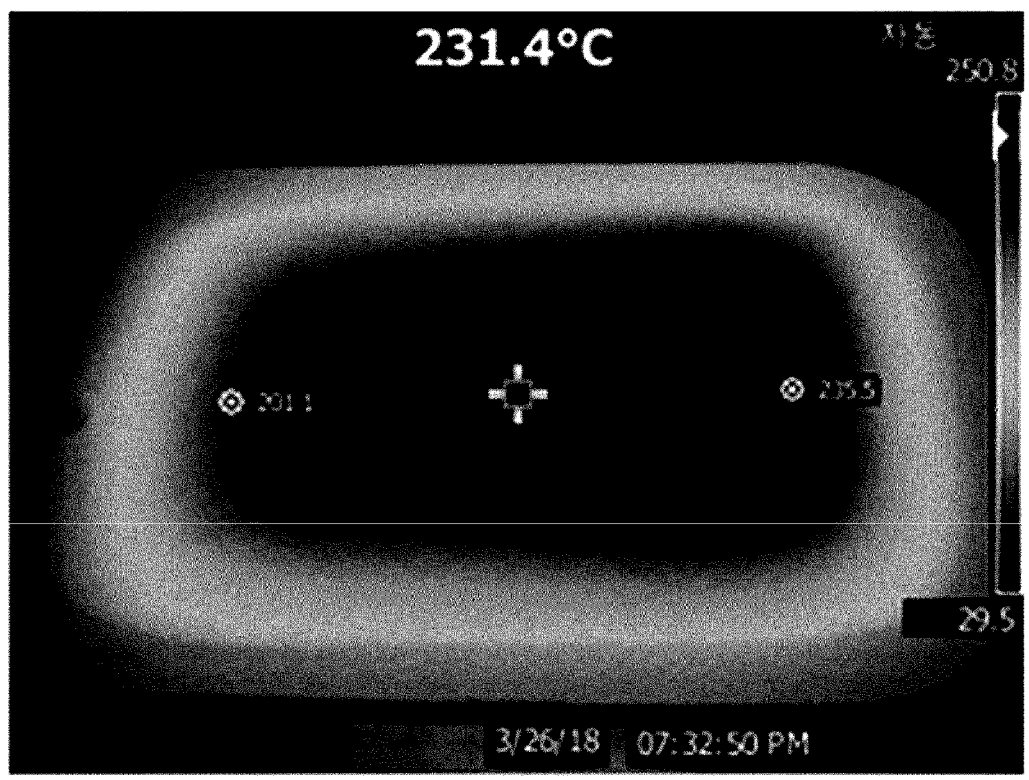
FIG. 2 is a thermal image of the electric roasting pan manufactured in Example 1, observed by a thermal imaging camera.

As a result, as shown in FIG. 2, it was confirmed that the stone pan was evenly heated when a constant voltage was applied, thereby substantially preventing an occurrence of temperature deviation depending on an area.

Figure 3:
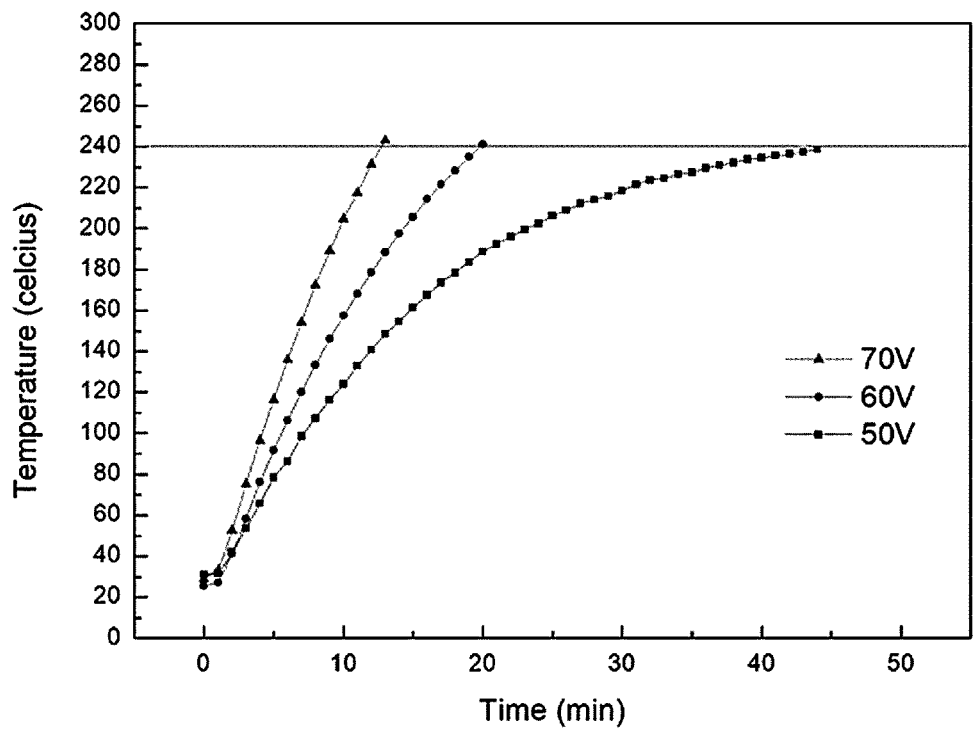
FIG. 3 is a graph showing temperature change over time at each voltage of the electric roasting pan manufactured in Example 1.

FIG. 3 is a graph showing the temperature of the stone pan over time at each voltage, and it was confirmed therefrom that as the applied voltage was increased, the temperature of the stone pan was raised. Specifically, when a voltage of 50 V was applied, it took about 43 minutes to reach 240° C., when a voltage of 60 V was applied, it took about 18 minutes, and when a voltage of 70 V was applied, it took about 12 minutes. Upon comparison of the heating rate from 0 to 10 minutes, the heating rates of about 9.5° C./min at an applied voltage of 50 V, about 13.1° C./min at an applied voltage of 60 V, and about 18° C./min at an applied voltage of 70 V were confirmed.

Experimental Example 2

Evaluation of Temperature Maintenance of Electric Roasting Pan Depending on Voltage In order to evaluate that the temperature of the electric roasting pan manufactured in Example 1 was maintained constant depending on voltage, the electric roasting pan was maintained at an applied voltage of 70 V for 10 minutes and then at a decreased voltage of 40 V, and thus, the voltage was applied to the electric roasting pan for total 60 minutes to measure the temperature of the stone pan with a thermal imaging camera (TiS50, FLUKE).

Figure 4:
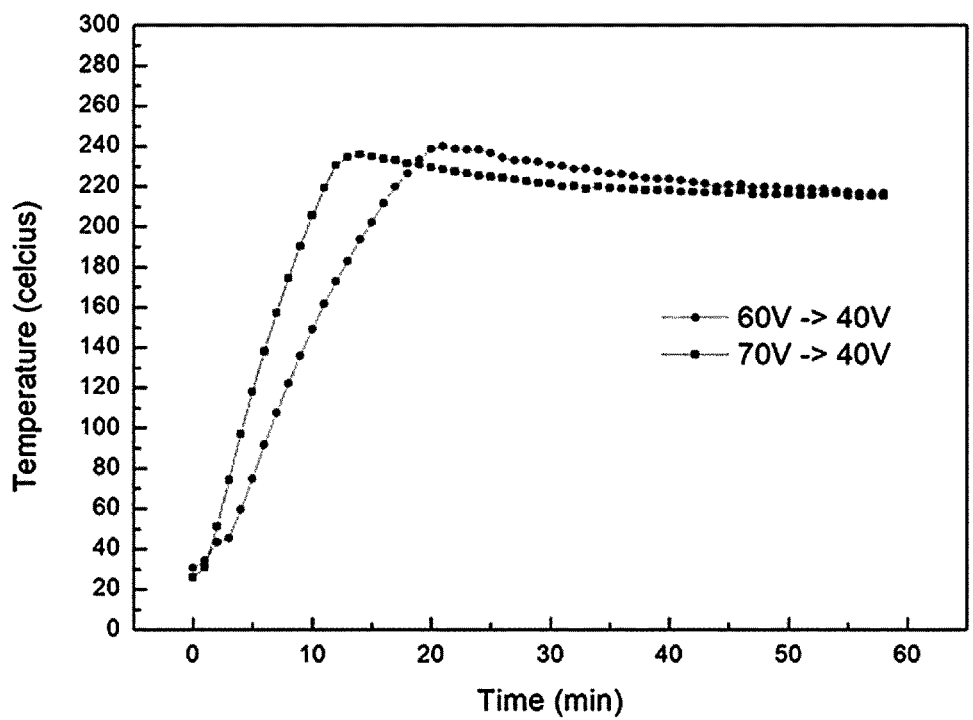
FIG. 4 is a graph showing temperature change over time at each voltage change of the electric roasting pan manufactured in Example 1.

As a result, as shown in FIG. 4, it was confirmed that the temperature of 220° C. was maintained after about 45 minutes. It was found therefrom that the electric roasting pan manufactured in Example 1 may precisely control the temperature by applied voltage.

Experimental Example 3

Evaluation of Heating Rate of Roasting Pan Depending on Thickness

In order to evaluate the heating rate of the electric roasting pan depending on the thickness of the roasting pan, a voltage of 70 V was applied to each of the electric roasting pans manufactured in Examples 1 and 2 which are different only in the thickness to measure a time to raise the temperature to 240° C.

Figure 5:
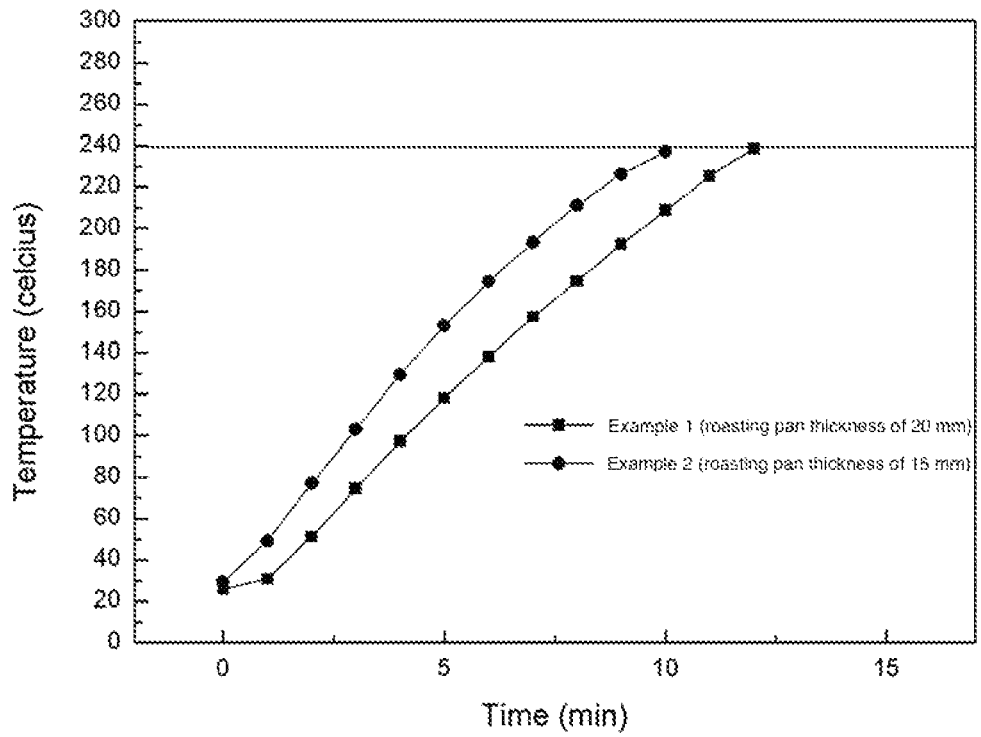
FIG. 5 is a graph showing heating rate change of the roasting pan depending on a thickness of roasting pans of the electric roasting pans manufactured in Examples 1 and 2 at the same applied voltage.

As a result, as shown in FIG. 5, when the roasting pan had a thickness of 20 mm, it took about 14 minutes to reach 240° C., and when the roasting pan had a thickness of 15 mm, it took about 10 minutes to reach 240° C., which means the heating rate was higher. Upon comparison of the heating rates from 0 to 10 minutes in Examples 1 and 2, when the thickness of the roasting pan was 20 mm, the heating rate was 18° C./min, and when the thickness of the roasting pan was 15 mm, the heating rate was 24° C./min. Therefore, it was found that the thinner the roasting pan of the electric roasting pan is, the shorter the time of the roasting pan is.

Experimental Example 4

Comparison Evaluation with Conventional Electric Roasting Pan Using Heat Wire Heater In order to evaluate thermal efficiency characteristics of the electric roasting pan manufactured in Example 1 and a conventional electric roasting pan using a heat wire heater as a control group, temperature change of the roasting pan over time at a certain voltage was measured with a thermal imaging camera (TiS50, FLUKE).

The conventional electric roasting pan using a heat wire heater is heated in a manner of installing a heat wire heater and placing a roasting pan thereon. Since the conventional electric roasting pan is heated only in the heat wire heater, it was confirmed that it took a long time to heat the entire roasting pan.

Figure 6:
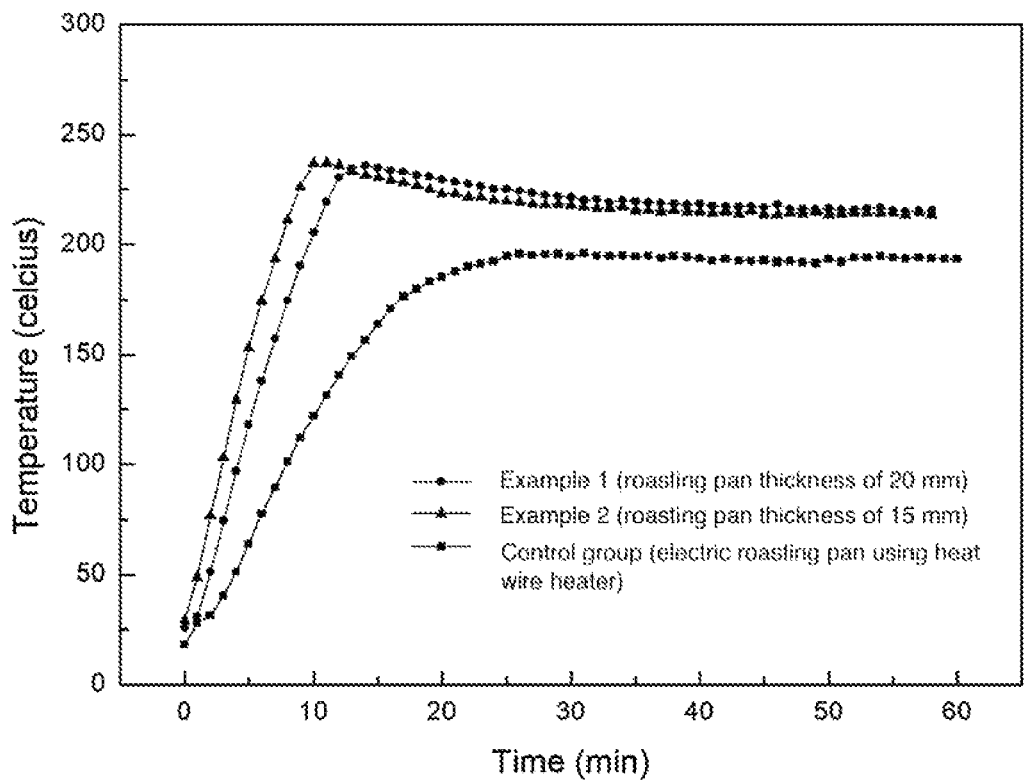
FIG. 6 is a graph showing temperature change of a roasting pan of a conventional electric roasting pan using a heat wire, and the electric roasting pans manufactured in Examples 1 and 2, over time at the same applied voltage.

Specifically, as shown in FIG. 6, it was confirmed that the conventional electric roasting pan did not reach 240° C. and maintained about 180° C. In addition, it was confirmed that it took more than 25 minutes to reach a maximum temperature. However, it was confirmed from FIG. 6 that the electric roasting pan manufactured in Examples 1 and 2 had a significantly high heating rate to reach 240° C. as compared with the conventional electric roasting pan using a heat wire heater.

Therefore, it was found that the electric roasting pan according to the present invention had a relatively rapid speed to reach a target temperature even at a low voltage as compared with the conventional electric roasting pan in a heat wire heater manner, and thus, had very good thermal efficiency.

DETAILED DESCRIPTION OF MAIN ELEMENTS

10: roasting pan, 10s: protruding line,
10h: through-hole, 20: heating layer,
30: electrode, 31a (31b): first unit electrode,
32a (32b): second unit electrode, 33a (33b): third unit electrode,
34a (34b): fourth unit electrode

The invention claimed is:

1. An electric roasting pan comprising: a roasting pan, a heating layer in surface contact with the roasting pan, and an electrode in contact with the heating layer,
    wherein the heating layer is formed of a heating composition including carbon nanotubes and a silicon-based adhesive,
    wherein the heating layer has an average thickness of 10 μm to 2 mm,
    wherein the roasting pan has an average thickness of 5 mm to 30 mm,
    wherein one surface of the roasting pan has a surface roughness of 100 μm to 1000 μm,
    wherein the electrode includes a plurality of unit electrode pairs including a positive electrode and a negative electrode, and the unit electrode pairs are spaced apart from each other, a local temperature deviation is caused in the heating layer, based on a spaced line formed by spacing between the unit electrode pairs, and
    wherein the electric roasting pan satisfies the following relation: $0.5 \leq A_H/A_G \leq 1$, where $A_H$ is an area of the heating layer in contact with the roasting pan and $A_G$ is an entire area of the roasting pan.

2. The electric roasting pan of claim 1, wherein
    the heating layer includes unit heating region surfaces having temperatures differently controlled by the unit electrode pairs, and
    the other surface of the roasting pan in contact with the heating layer includes a plurality of unit roasting pan region surfaces corresponding to the unit heating region surfaces and the unit roasting pan region surfaces have temperatures which are controlled independently of each other.

3. The electric roasting pan of claim 2, further comprising: a plurality of temperature sensors in contact with the unit heating region surfaces or the unit roasting pan region surfaces and a control unit, wherein the plurality of temperature sensors measure temperatures of the unit roasting pan in real time, and wherein the control unit may adjust an electric power amount applied to the heating layer, so the temperature of the unit roasting pan region surfaces or the unit roasting pan region surface are independently controlled based on the temperatures measured by the temperature sensor.

4. The electric roasting pan of claim 2, wherein
    the unit heating region surfaces have different compositions or composition ratios, and
    the temperatures of the unit heating region surfaces are independently controlled by a difference in the composition or the composition ratio.

5. The electric roasting pan of claim 1, further comprising: a temperature sensor in contact with the roasting pan or the heating layer.

6. The electric roasting pan of claim 1, further comprising: a power supply unit which independently applies electric power to the unit electrode pairs.

7. The electric roasting pan of claim 6, wherein the power supply unit applies a voltage of 5 to 240 V to the heating layer.

8. The electric roasting pan of claim 1, wherein the heating composition for forming the heating layer is applied after forming the electrode on one surface of the roasting pan.

9. The electric roasting pan of claim 1, wherein the heating composition is applied to one surface of the roasting pan to form the heating layer and then the electrode is bonded to the heating layer by an adhesive composition.

10. The electric roasting pan of claim 1, wherein the heating composition further includes a binder.

11. The electric roasting pan of claim 10, wherein the heating composition includes 1 to 50 wt % of the carbon nanotubes, 1 to 30 wt % of the silicon-based adhesive, 1 to 20 wt % of the binder, 1 to 20 wt % of a dispersant, and 1 to 90 wt % of an organic solvent.

12. The electric roasting pan of claim 11, wherein
the binder includes any one or more organic binders selected from ethyl cellulose and nitrocellulose, and
the organic solvent includes any one or two or more selected from acetone, methyl ethyl ketone, methyl alcohol, ethyl alcohol, isopropyl alcohol, butyl alcohol, ethylene glycol, polyethylene glycol, tetrahydrofuran, dimethylformamide, dimethylacetamide, N-methyl-2-prrolidone, hexane, cyclohexanone, toluene, chloroform, dichlorobenzene, dimethylbenzene, trimethylbenzene, pyridine, methylnaphthalene, nitromethane, acrylonitrile, octadecylamine, aniline, dimethylsulfoxide, diethylene glycol ethyl ether, and terpineol.

* * * * *